(12) United States Patent
New

(10) Patent No.: US 6,767,133 B2
(45) Date of Patent: Jul. 27, 2004

(54) TILTING PAD BEARING ARRANGEMENT

(75) Inventor: Nigel Henry New, Harrow (GB)

(73) Assignee: Delaware Capital Formation, Inc., Wilmington, DE (US)

( * ) Notice: Subject to any disclaimer, the term of this patent is extended or adjusted under 35 U.S.C. 154(b) by 43 days.

(21) Appl. No.: 10/182,175

(22) PCT Filed: Jan. 30, 2001

(86) PCT No.: PCT/GB01/00349

§ 371 (c)(1),
(2), (4) Date: Jul. 25, 2002

(87) PCT Pub. No.: WO01/57408

PCT Pub. Date: Aug. 9, 2001

(65) Prior Publication Data

US 2003/0012468 A1 Jan. 16, 2003

(30) Foreign Application Priority Data

Feb. 5, 2000 (GB) .............................................. 0002574

(51) Int. Cl.⁷ .............................................. F16C 17/03
(52) U.S. Cl. ....................................... 384/312; 384/309
(58) Field of Search ............................... 384/117, 122, 384/302–312

(56) References Cited

U.S. PATENT DOCUMENTS

| | | |
|---|---|---|
| 3,022,123 A | 2/1962 | Gruber |
| 3,544,177 A | 12/1970 | Tallian et al. |
| 3,610,711 A * | 10/1971 | Mierley, Sr. ................ 384/311 |
| 3,708,216 A | 1/1973 | Gerling |
| 4,039,228 A | 8/1977 | Repose et al. |
| 4,247,157 A | 1/1981 | Sigg |
| 4,714,357 A | 12/1987 | Groth et al. |
| 5,482,380 A | 1/1996 | Corratti et al. |
| 5,795,077 A | 8/1998 | Gozdawa |

FOREIGN PATENT DOCUMENTS

| | | |
|---|---|---|
| CH | 558481 | 1/1975 |
| EP | 0368558 | 5/1990 |
| FR | 731310 | 9/1932 |
| GB | 396965 | 8/1933 |
| GB | 1397551 | 6/1975 |
| GB | 2180888 | 4/1987 |
| GB | 2268549 | 1/1994 |
| GB | 2292192 | 2/1996 |
| RU | 2018733 | 8/1994 |
| WO | 96/13672 | 5/1996 |

* cited by examiner

Primary Examiner—Thomas R. Hannon
(74) Attorney, Agent, or Firm—Howard & Howard

(57) ABSTRACT

A tilting pad bearing arrangement (10) (FIG. 1(a)) includes an array of bearing pads ($15_i$) supported on a carrier (16). For each pad, the carrier pad surfaces have cylindrically concave recesses ($28_i$, $29_i$), respectively formed therein with their axis orthogonal to each other. Linkng means (30) has opposite faces of cylindrically convex form conforming to the recesses to make sliding contact therewith, load is transmitted by way of an area, rather than line or point contact, reducing stress on components, while avoiding the high levels of friction associated with spherical seating of similar curvature and being cheaper to manufacture. The linking means may be manufactured from an assembly of plano-convex parts and shims to define thickness.

13 Claims, 4 Drawing Sheets

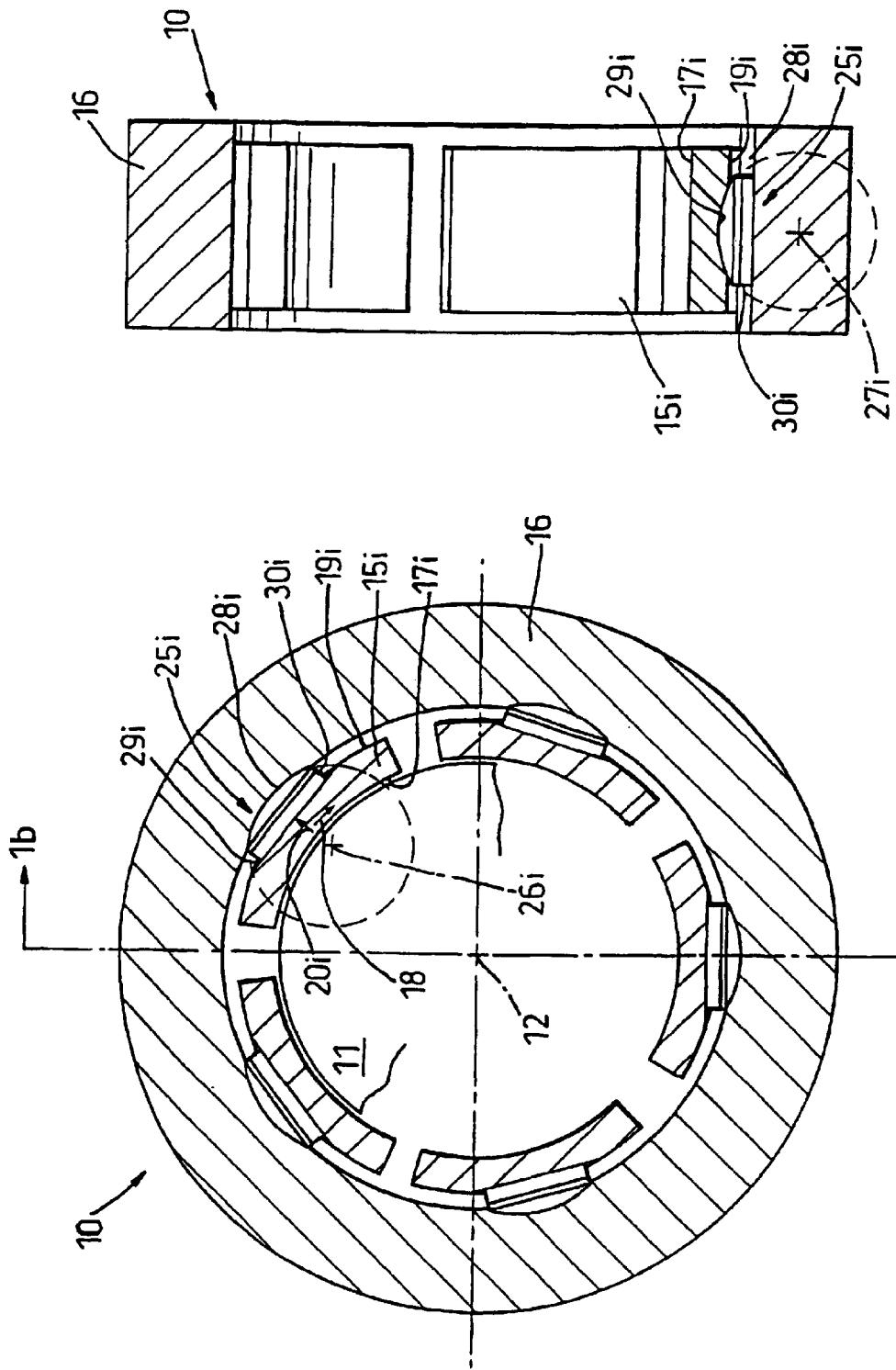

TILTING PAD BEARING ARRANGEMENT

Figure 1C:
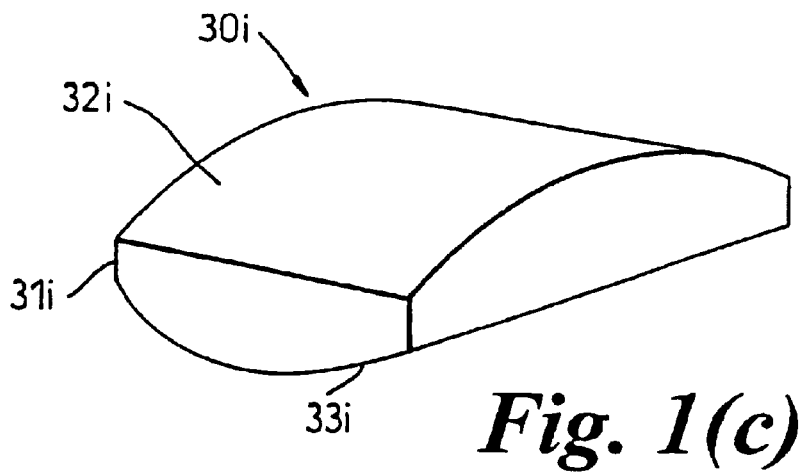

This invention relates to bearing arrangements generally known as of the tilting pad type, wherein a ring of individual bearing pads are arrayed about a rotating article, such as a radially facing shaft journal or an axially facing thrust collar, each pad having an obverse face, against which the article bears and across which it moves, and reverse face, which is supported with respect to a pad carrier such that the pad can undergo a limited degree of tilting at least in the direction of article motion.

The invention relates to both journal and thrust bearing forms but is particularly suited to journal bearings.

It is known from GB-A-1397551 and GB-A-2268549 to have journal bearings wherein essentially cylindrically curved bearing pads are supported against a cylindrical carrier formed by the bearing housing and, from the latter, to have the reverse face of the pad convexly curved in a transverse direction and be seated in a matching concave recess in the housing, permitting the pad to align with respect to the housing to accommodate misalignment between shaft and housing, but to retain its ability to rock with respect to the housing. Such arrangements require the relationship between obverse and reverse faces of each pad and the housing to be maintained for the whole of each pad face and for all pads, including replacements.

It is known from U.S. Pat. Nos. 4,714,357 and U.S. Pat. No. 3,022,123 to have, instead of a shaped reverse pad face, a separately attached pivot member exhibiting a barrel-shaped surface which permits both tilting in the direction of shaft surface motion and orthogonally thereto for alignment.

It is furthermore known, for example from GB-A-2180888, to have bearing pads for journal and thrust bearings supported on spherical surfaces which are unrestricted in direction of tilt, such spherical surfaces offering a point contact between the relatively moving pads and carrier.

Such pad tilt arrangements all function by a "rolling" of the pad as it tilts, which requires that the pivot arrangement involves a line or point contact through which all bearing loading is transmitted to the pad carrier or housing; such concentration of forces may place constraints on materials employed for the bearing pads and/or pad dimensions to withstand such forces without distortion.

It is also known, for example from GB-B-2292192 and CH-B-558481 to mitigate problems associated with line and point contact by having mating convex and concave surfaces of spherical form whereby the load is transferred over the area of contact between the mating surfaces, rather than a point or line, but at the expense of increased friction in the tilting process. Such spherically curved mating surfaces tend to be of limited extent, both as a compromise between increasing friction and maximising load spreading and to be economially viable.

It will be appreciated that such pivot means which effect contact over an area of co-operating surfaces effect tilting of the bearing pad by rotating it about a primary pivot axis which is fixed with respect to the carrier, such primary pivot axis extending in a direction which is mutually orthogonal to the direction of motion of the article surface across the bearing pad and the direction in which load is transferred thereby into the carrier.

Tilting pad journal bearings are known, for example from WO 96/13672, which are limited to effecting pivoting, in place of tilting, about the primary tilt axis alone.

As well as the variants above, thrust bearings are likewise known in which the reverse face of each thrust pad is supported clear of a carrier by way of a protuberance on either the pad face or carrier, either a spherically curved protuberance giving a point contact as a simple radially-extending fulcrum ridges giving a line contact.

It is an object of the present invention to provide a tilting pad bearing arrangement of the type wherein each pad is supported on pivot means whose surfaces define an area of contact and able to tilt by rotation about more than a primary pivot axis by relative sliding motion between the surfaces, which mitigates the at least some of the constraints on, and complexity and cost of, known arrangements.

According to the present invention a tilting pad bearing arrangement, for supporting an article movable relative thereto in rotation about a rotation axis, comprises a plurality of bearing pads and a load bearing carrier of the pads, each of the pads having an obverse article-supporting face extending in the direction of article motion and a reverse supported face adapted to transfer load to the carrier in a loading direction perpendicular to the motion direction, and associated with each pad, pivot means operable to support the pad separated from the carrier and permit the pad to tilt about a primary tilt axis perpendicular to the motion and loading directions, said pivot means comprising a pad recess formed in the reverse face of the pad, a carrier recess formed in the face of the carrier, and linking means extending between said pad recess and carrier recess, one of the recesses having a cylindrically concave surface centred on the primary tilt axis, the other recess having a cylindrically concave surface centred on a secondary tilt axis perpendicular to the primary tilt axis, and the linking means having defined on each of opposite sides thereof associated with respective recesses a surface of cylindrically convex curvature conforming to the curvature of the associated recess to make sliding contact therewith over the common area of said convex and concave surfaces.

The dimension of each of said convex opposite sides of the linking means in the direction of the cylindrical axis thereof may be substantially equal to the other. Furthermore, the dimensions of each said convex sides of the linking means in the direction of the cylindrical axis thereof may be substantially equal to the dimension of the opposite convex side in a direction perpendicular to the direction of the cylindrical axis of said opposite side.

Preferably at least one of the pad recess and carrier recess comprises a minor sector of the cylinder of which it is part.

The linking means may comprise a unitary body or a stack of linking members, the opposite sides of the linking means being defined by a pair of outer linking members each having a wall of cylindrically convex curvature. There may be provided between the outer linking members intermediate linking means operable to define the separation between said convex surfaces.

In such linking means formed by a stack of linking members there may be provided tie means operable to impede relative movement between the outer linking members at least in a direction in the plane parallel to, or containing, both first and second cylindrical axis.

The tie means may comprise at least one projection and/or recess at the inward facing surface of each outer linking member and a co-operating at least one recess and/or projection in the inward facing surface of the other outer linking member or of the intermediate linking means.

Furthermore, the tie means may be operable to impede separation of the outer linking members with respect to each other.

At least one of said pad and carrier recesses may include boundary means to limit motion of the linking member therealong in at least one direction.

Figure 2A:
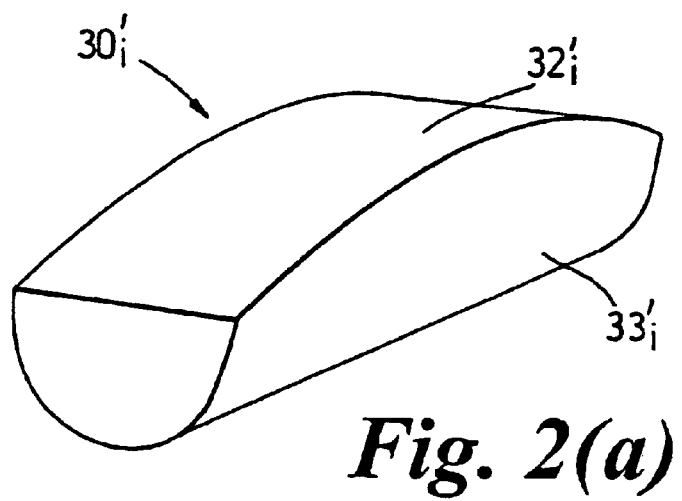
Figure 2B:
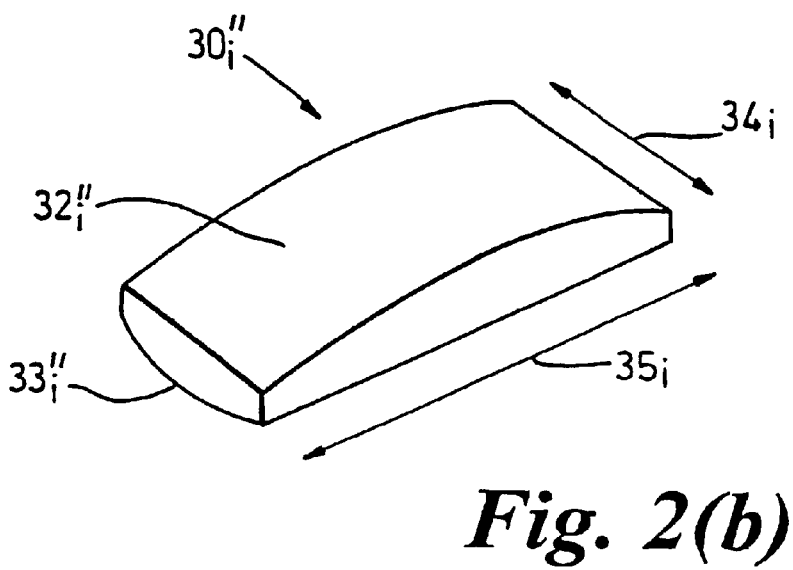
Figure 3A:
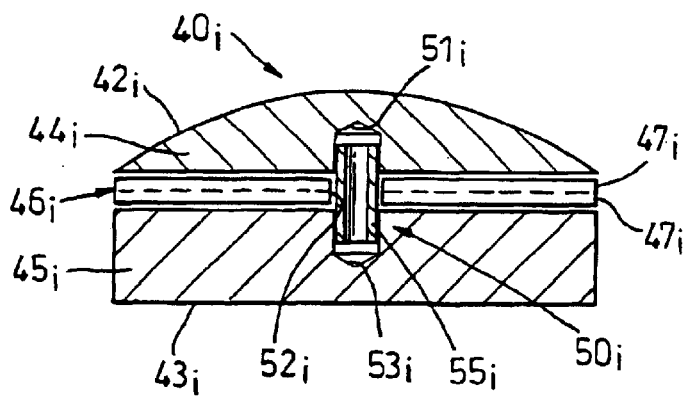
Figure 3B:
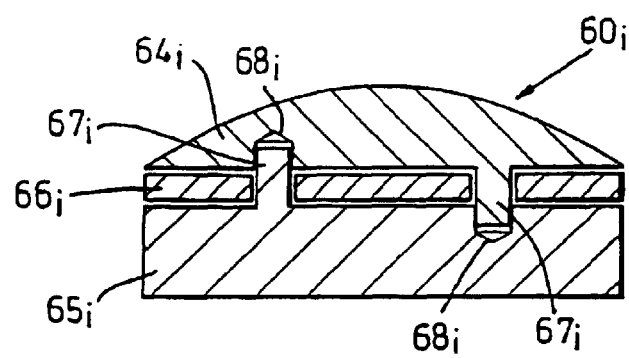
Figure 3C:
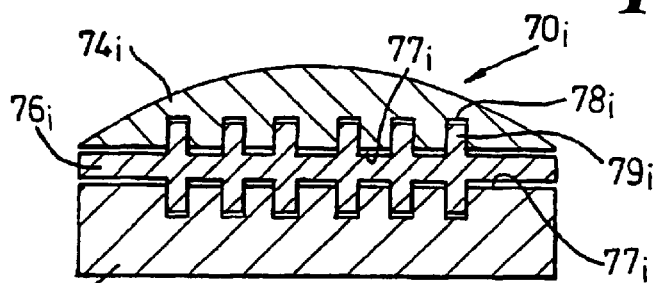
Figures 3D, 3E, 3F:
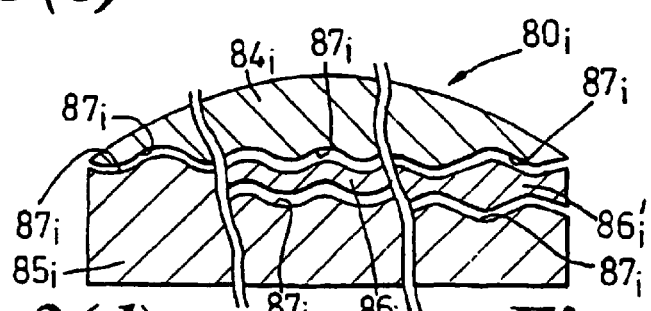
Figure 3G:
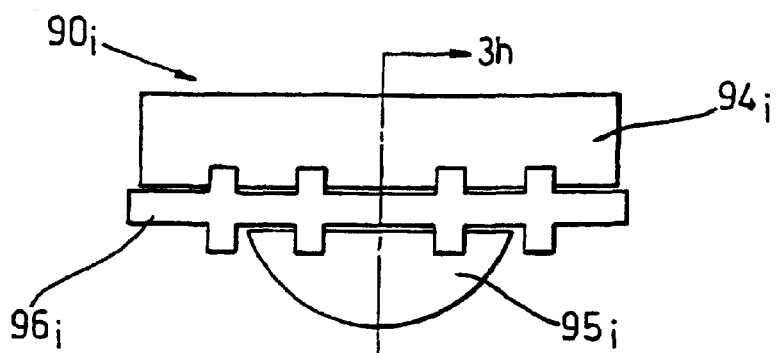
Figure 3H:
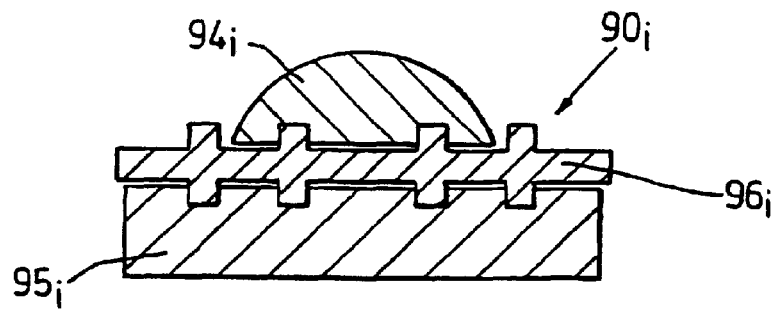
Figure 4:
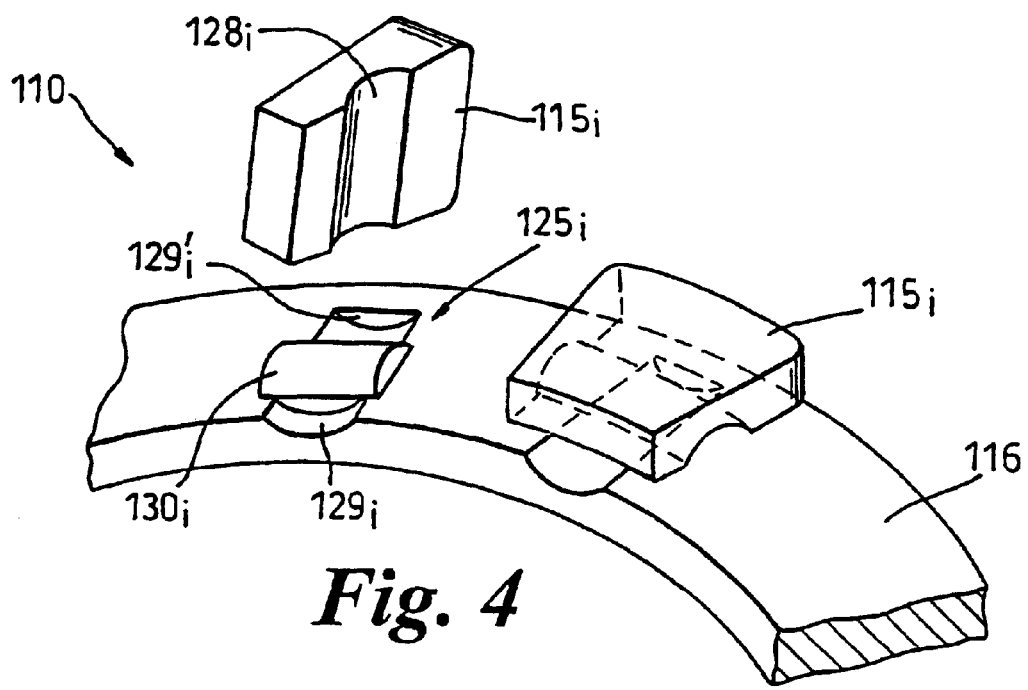

Embodiments of the invention will now be described with reference to the accompanying drawings, in which FIG. 1(a) is a cross-sectional elevation through a radial, or journal, bearing in accordance with the present inventon, having a plurality of bearing pads disposed with respect to a carrier, FIG. 1(b) is a cross-sectional elevation of the journal bearing of FIG. 1(a) taken along the lines 1b—1b thereof, the Figures each illustrating cylindrically concave recesses on the pads and carrier joined by linking means, FIG. 1(c) is a perspective view through a first form of linking means as employed in FIGS. 1(a) and 1(b), FIGS. 2(a) and 2(b) are perspective views of alternative forms of linking means, FIGS. 3(a) to 3(h) are sectional elevations through yet further forms of linking means, all of which comprise a stack of linking members, and FIG. 4 is a perspective view of an axial, or thrust bearing arrangement in accordance with the invention.

Referring to FIGS. 1(a) to 1(c) a tilting pad journal bearing arrangement 10 supports an article, shaft 11, which is movable relative thereto in rotation about a rotation axis 12. The arrangement 10 comprises a plurality of arcuate bearing pads $15_i$ (where i=1 to 5), arrayed around the periphery of the shaft and a load-bearing carrier of the pads 16. Each of the pads $15_i$ has an obverse, shaft-supporting face $17_i$ extending in the direction of shaft motion, indicated by arrow 18, as well as orthogonally thereto, and a reverse, supported face $19_i$ adapted to transfer loading, by the shaft to carrier 16 in a loading direction perpendicular to the motion direction, indicated by arrow $20_i$. Each pad $15_i$ is supported separated from the carrier by pivot means, indicated generally at $25_i$.

The pivot means permits the pad to tilt about a primary tilt axis $26_i$ which is perpendicular to the motion direction 18 and loading direction $20_i$ and also to tilt about a secondary tilt axis $27_i$ which is perpendicular to the primary tilt axis $26_i$ and parallel to the motion direction.

The pivot means $25_i$ comprises a pad recess $29_i$ formed in the reverse face $19_i$ of the pad, a carrier recess $28_i$ formed in the face of the carrier and linking means $30_i$ extending between the pad recess and carrier recess. The carrier recess $28_i$ has a cylindrically concave surface centred on, and defining, the primary tilt axis $26_i$ and the pad recess $29_i$ has a cylindrically concave surface centred on, and defining, the secondary tilt axis $27_i$.

The linking means $30_i$, as illustrated in FIG. 1(c), comprises a unitary body 31 having defined on opposite sides thereof first and second faces $32_i$ and $33_i$ associated with respective ones of the recesses $28_i$ and $29_i$. Each of said opposite sides has a surface of cylindrically convex curvature conforming to the curvature of the associated recess to make sliding contact therewith over the common area of the convex and concave surfaces. That is, imperfections aside, there is an area contact between pad and linking member and between linking member and carrier by way of which load is transmitted, rather than a line or point contact which can lead to deformation of components.

It will be seen that each of the pair of cylindrical interfacing between the part and carrier permits a relatively large contact area for each which allows the loading on each component to be tailored to its physical properties, almost independently of the other, by virtue of choosing the length convex free of the linking means and radius of curvature of the associated recess. Furthermore, the ratio of contact area to radius of curvature is less than for a spherical seating, permitting a relatively large radius of curvature with relatively small dimensions and less friction than hitherto.

In the linking member $30_i$ illustrated in FIG. 1(c) the dimensions of the first and second surfaces $32_i$ and $33_i$ of the cylindrically convex opposite sides are conveniently substantially equal, in perimeter length dimensions and curvature. It will be appreciated that the radius of curvature of each convex surface $32'_i$ and $33'_i$, and its associated recess, may be different from the other as illustrated in FIG. 2(a) in lining member $30'_i$; alternatively or additionally, the perimeter dimension $34_i$ of said surface $32''_i$ in the direction of the cylindrical generator axis may be different from that $35_i$ of the other surface $33_i$ as illustrated in FIG. 2(b) in linking member $30''_i$.

Preferably, but not necessarily, each recess comprises a minor sector of the cylinder of which it is part, permitting the linking member to be simply placed therein and removed, the combination of orthogonally disposed recess causing the linking member to be retained in place during operation of the bearing by the shaft and bearing pads.

It will be appreciated that although it is geometrically attractive to form the linking member as a unitary body, there may be the need to vary the precise separation of the carrier and pad grooves to accommodate manufacturing tolerance in pad thickness, and to reduce manufacturing costs associated with its manufacture.

Referring now to FIG. 3(a) this shows in sectional elevation a second form of linking means $40_i$ comprising a stack of linking members. Cylindrically convex faces $42_i$ and $43_i$ are formed on respective ones of a pair of outer linking members $44_i$ and $45_i$. Such an arrangement permits a simplified manufacture by forming each such linking member with only a single cylindrically convex surface, and, where the curvatures are the same, the same part may be used for both members.

Most usefully, this form of linking means optionally includes in the stack between the outer members $44_i$ and $45_i$ intermediate linking means $46_i$ which is operable to define the separation distance between the convex surfaces. This intermediate linking means may comprise one or more thickness defining shims $47_i$.

It will be appreciated that the members of the stack will be clamped together by the loading force acting between the convex faces of the outer members, but to impede relative sliding movement between the members in the plane parallel to, or possibly containing, both first and second cylindrical axis in the absence of sufficient frictional engagement between the surfaces, tie means is provided as indicated generally at $50_i$.

The outer members $44_i$ and $45_i$ are plano-convex and the intermediate member(s) substantially flat faced. The tie means $50_i$ comprises a blind recess $51_i$ in the outer member $44_i$, a through-aperture $52_i$ in intermediate means $46_i$ and a further blind recess $53_i$ in the outer member $45_i$ in which is fitted, and retained by friction, radially compressible spring pin $55_i$. The pin projects through the intermediate means and into the recess $51_i$ where it also forms an interference fit with the member $44_i$. Such tie means which has an interference fit with both outer members also serves to prevent them separating when not clamped together under load.

It will be appreciated that the tie means may take other forms some of which are illustrated schematically in FIGS. 3(b) to 3(h).

Referring to FIG. 3(b) which is a sectional elevation similar to FIG. 3(a) of a third form of linking means $60_i$, the means is provided by one or both of the outer members $64_i$ and $65_i$ including an integral upstanding pin member $67_i$ whereas the other outer member includes in alignment therewith a pin receiving recess $68_i$. As shown, any intermediate member $66_i$ is apertured to permit passage of any pin and retained against lateral displacement thereby.

Referring to FIG. 3(c) and linking means $70_i$, the outer members $74_i$ and $75_i$ each have an array of recesses $78_i$ formed the non-convex surface $77_i$ facing the other member, and an intermediate member $76_i$ has on each of its opposite faces an array of projections $79_i$ co-operable with the recesses, whereby each of the outer members is tied and restrained laterally by the intermediate member. The intermediate member may, of course be adjusted for effective thickness by stacking therewith one or more than shim members having an array of through aperture aligned with the projections. Furthermore the projections may form an interference fit with, or be bonded into, the recesses $78_i$ to impede separation of the outer linking members with respect to each other.

Referring to FIG. 3(d), in further form of linking means $80_i$, the outer members $84_i$ and $85_i$ each have, on the non-convex surface 87 facing the other member, an undulating or serrated surface $87_i$ arranged so that the facing undulations interengage and provide impedance to lateral relative movement when under bearing load. If necessary, as shown in FIG. 3(e) one or more thin and flexible shim members $86_i$ may be disposed between the undulating faces to conform therewith and define a precise spacing between the convex faces; alternatively, as shown in FIG. 3(f) a thicker intermediate member $86'_i$ may be employed, opposite undulating faces of which engage to respective outer members in a manner analogous to the projections and recesses of $78_i$ and $79_i$ of linking means $70_i$.

In all of the above described and illustrated embodiments of stacked linking means, the dimension of the cylindrically convex surfaces are substantially uniform in orthogonal directions and the same as each other.

Referring to FIG. 3(g) which is a sectional elevation through a yet further embodiment of linking means $90_i$, and FIG. 3(h) which is a sectional elevation along the direction $3h$—$3h$ of FIG. 3(a), it will be seen that each of the outer, plano-convex linking members $94_i$, $95_i$ is longer in its axial direction than transversely thereto and mounted with respect to an intermediate member $96_i$ which accommodates the length of each outer member in the two axial directions, in the manner of FIG. 3(c). It will be appreciated that such structure readily accommodates different curvatures for each of the outer members.

It will be appreciated that although a radial, journal bearing arrangement has been employed to illustrate the use of orthogonally disposed cylindrically concave recesses and conforming linking means, such recesses and linking means are equally suited to an axial, thrust bearing arrangement 110 as illustrated in FIG. 4.

This illustrates substantially planar bearing pads $115_i$ each supported above an annular carrier 116 by pivot means $125_i$ comprising a cylindrically concave recess $128_i$ in the reverse face of the pad, a cylindrically concave recess $129_i$ in the carrier and linking means $130_i$ taking any of the forms described above.

The bearing embodiment 110 also illustrates that at least one of the recess pair, $129_i$ is bounded at at least one end by wall $129'_i$ to limit motion of the linking means therealong. The, or any other, recess may be bounded at one or both ends, and such bounding may be applied equally to the journal bearing embodiments described above.

It will be appreciated that it is a matter of choice as to which of the recesses extending in the direction of article rotation and which extends orthogonally thereto.

What is claimed is:

1. A tilting pad bearing arrangement, for supporting an article moveable relative thereto in rotation about a rotation axis, the arrangement comprising a plurality of bearing pads and a load bearing carrier of the pads, each of the pads having an obverse article-supporting face extending in the direction of article motion and a reverse supported face adapted to transfer load to the carrier in a loading direction perpendicular to the motion direction, and associated with each pad, pivot structure operable to support the pad separated from the carrier and permit the pad to tilt about a primary tilt axis perpendicular to the motion and loading directions, said pivot structure comprising a pad recess formed in the reverse face of the pad, a carrier recess fanned in the face of the carrier, and linking structure extending between said pad recess and carrier recess, one of the recesses having a cylindrically concave surface centered on the primary tilt axis, the other recess having a cylindrically concave surface centered on a secondary tilt axis perpendicular to the primary tilt axis, and the linking structure having defined on each of opposite sides thereof associated with respective recesses a surface of cylindrically convex curvature conforming to the curvature of the associated recess to make sliding contact therewith over the common area of said convex and concave surfaces.

2. A bearing arrangement of claim 1 characterized in that the dimension of each of said convex opposite sides of the linking structure in the direction of the cylindrical axis thereof is substantially equal to the other.

3. A bearing arrangement of claim 1 characterized in that the dimensions of each said convex sides of the linking structure in the direction of the cylindrical axis thereof is substantially equal to the dimension of the opposite convex side in a direction perpendicular to the direction of the cylindrical axis of said opposite side.

4. A bearing arrangement as claimed in claim 1 characterized in that at least one of the pad recess and carrier recess comprises a minor sector of the cylinder of which it is part.

5. A bearing arrangement of claim 1 characterized in that the radius of curvature of the pad recess is substantially equal to the radius of curvature of the carrier recess.

6. A bearing arrangement of claim 1 in that the linking structure comprises a stack of linking members, the opposite sides of the linking structure being defined by a pair of outer linking members each having a wall of cylindrically convex curvature.

7. A bearing arrangement of claim 6 characterized by, between the outer linking members, intermediate linking structure operable to define the separation between said walls of cylindrically convex curvature.

8. A bearing arrangement of claim 7 characterized by tie structure operable to impede relative movement between the outer linking members at least in a direction in the plane parallel to, or containing, both first and second cylindrical axis.

9. A bearing arrangement of claim 8 characterized in that the tie structure comprises at least one projection and/or recess at the inward facing surface of each outer linking member and a co-operating at least one recess and/or projection in the inward facing surface of the other outer linking member or of the intermediate linking structure.

10. A bearing arrangement as claimed in claim 9 characterized in that the tie structure is operable to impede separation of the outer linking members with respect to each other.

11. A bearing arrangement as claimed in claim 9 characterized in that the tie structure comprises a pin extending between aligned recesses in the inward facing surfaces of said outer linking members.

12. A bearing arrangement as claimed in claim 6 characterized in that the outer linking members are of plano-convex form having a substantially flat inwardly facing surface.

13. A bearing arrangement as claimed in claim 1 characterized in that at least one of said pad and carrier recesses includes boundary structure to limit motion of the linking structure therealong in at least one direction.

* * * * *